United States Patent Office 2,722,517
Patented Nov. 1, 1955

2,722,517
LUBRICATING OIL MODIFIERS

Paul V. Smith, Jr., Westfield, Frederick Knoth, Jr., Sayreville, and Walter E. Waddey, Roselle, N. J., assignors to Esso Research and Engineering Company, a corporation of Delaware No Drawing. Application September 30, 1950,
Serial No. 187,826

4 Claims.  (Cl. 252—46.7)

The present invention relates to improved lubricating oil modifiers and to lubricating oils, and the like, containing such modifiers. More particularly, the invention pertains to an improved class of modifiers for lubricants which confer extreme pressure or load-carrying properties on the lubricants.

It is well known in the art, that certain active chemical ingredients when added to lubricating oils, especially mineral base lubricating oils, greases, and the like, have the property of improving the load-carrying capacity of such lubricants. In particular, it is known that products containing sulfur, phosphorus, chlorine and a few other active chemical elements tend to react with metal surfaces at elevated temperatures to provide thereon protective films which improve lubrication under extremely high unit pressures.

The present invention is based upon the discovery that certain reaction products of halides of phosphorus with certain organic epoxides impart excellent oiliness and extreme pressure properties to lubricating oils. In particular, the reaction products of the phosphorus chlorides with the lower alkylene epoxides, that is, those containing from 2 to 6 carbon atoms in the alkylene group, confer the properties mentioned to a good degree. These products may be used alone or in combination with other addition agents such as sulfurized and/or phosphorized fatty oils, fatty esters, terpenes, and other hydrocarbons which have been modified by the inclusion of active chemical elements.

Numerous references are made in the prior art to the treatment of fatty materials, unsaturated hydrocarbons, esters and various other organic materials with the sulfides and chlorides of phosphorus. The use of minor amounts of ethylene oxide and other epoxides in sulfur-containing products which tend to evolve hydrogen sulfide is also known in the prior art. In general, however, the epoxides have been used merely as stabilizers. They have not been consciously reacted with other ingredients, as far as applicants are aware, to produce new additives having the properties desired in the present application.

According to the present invention, the phosphorus halides may be reacted with various proportions of the epoxides to obtain the desired additives or modifiers. For most applications, it is preferred to use approximately theoretical proportions for complete reaction, but these proportions of the reactants may be varied from about 1 mol of the phosphorus halide for 3 mols of epoxide to as much as 1 mol of the phosphorus compound per mol of epoxide.

The reaction products may be prepared at ordinary temperatures by merely combining the ingredients and stirring them together. The reaction is exothermic and proceeds rapidly and, therefore, it is preferred to control the temperature by a suitable cooling bath. After the reaction has been completed, the reaction product may be added to a suitable lubricating oil or grease in proportions from as little as 0.5% to as much as 10%, or more, depending upon the character of the final lubricant product desired. For extreme pressure purposes, proportions of 2 to 10% by weight are preferred, but smaller proportions may be used when other load-bearing agents are employed in combination, such as sulfurized and phosphorized terpenes, fatty esters, fatty oils, phospho-sulfurized hydrocarbon oils, and the like.

The invention will be more particularly understood by reference to the following examples wherein phosphorus trichloride and lower alkylene oxides were reacted. It should be pointed out, however, that other halides of phosphorus may be used in lieu of the phosphorus trichloride. The corresponding bromine compounds may be used. The chlorine compounds are preferred, however, because they are more readily available commercially. $PCl_3$ is preferred and the preferred alkylene oxide is ethylene oxide. In lieu of ethylene oxide, other alkylene oxides, such as propylene, butylene and higher homologs may be substituted. The higher homologs appear to be somewhat less efficient for a given weight of additive. $C_2$ to $C_6$ alkylene oxides are preferred.

EXAMPLE I 1 mol of phosphorus trichloride and 3.3 mols of ethylene oxide (a 10% excess) were reacted together at room temperature according to the approximate formula

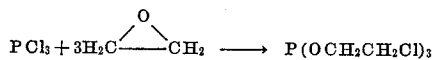

It appears quite likely that some of the isomeric

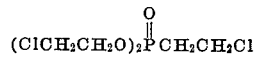

may be present. $P(OCH_2CH_2Cl)_3$ is known to isomerize upon heating for a number of hours at elevated temperature. Presumably some isomer might form merely on standing for a while. After the reaction was completed, 6% by weight of the reaction product, based on the total lubricant composition, was incorporated in a mineral lubricating oil of SAE 20 grade, increasing the load-carrying properties from about 2 to about 15 weights on the standard Almen test machine.

EXAMPLE II

A similar reaction was carried out in the same manner but using propylene oxide in place of ethylene oxide. The product was tested on the Almen machine in the same base stock used in Example I and carried 15 weights under both gradual and shock loading.

The composition of Example I also showed excellent load-carrying properties when combined in proportions of 1% with 9% of sulfurized sperm oil and 9% of phospho-sulfurized sperm oil, respectively. The data are shown in the following table.

*Table 1*

| Additive, Wt. Percent | SAE Scale lbs. at 1,000 R. P. M. | Almen Weights | | Copper Corrosion 1 hr. at 250° F. |
|---|---|---|---|---|
| | | Gradual | Shock | |
| 6% Product of Example I in conventionally refined Coastal oil, 40 S. U. S. viscosity at 210° F. | ---------- | 15 | 15 | |
| 1% Product of Example I, 9% Sulfurized Sperm Oil in SAE 90 Oil. | 150 | 15 | 13 | No Stain. |
| 1% Product of Example I, 9% Phospho-sulfurized Sperm Oil in SAE 90 Oil. | 245 | 15 | 11 | Do. |
| 10% Phospho-sulfurized Sperm Oil per se in SAE 90 Oil. | 85 | -------- | <5 | Do. |
| 10% Sulfurized Sperm Oil in SAE 90 Oil. | 70 | -------- | <5 | Do. |

The increase in SAE rating from 70 to 150, and from 85 to 245, respectively, is considered quite outstanding. The combination of 0.5 to 2% PCl₃-alkylene oxide reaction with 5 to 15% of sulfurized sperm oil, or preferably with phospho-sulfurized sperm oil for heavy duty, is very effective. A combination of about 1% of the reaction product with 9% of the fatty oil derivative appears about optimum. These ingredients may be used in greases as well as in oils.

What is claimed is:

1. A lubricating composition comprising a major proportion of a mineral lubricating oil, 0.5–2% by weight, based on the total composition, of the product obtained by contacting about 1 mol of PCl₃ with about 3 mols of ethylene oxide while stirring and cooling approximately to room temperature, and 5–15% by weight, based on the total composition, of sulfurized sperm oil.

2. Composition according to claim 1 containing about 9% of said sulfurized sperm oil.

3. Composition according to claim 1 wherein said sperm oil is phospho-sulfurized.

4. Composition according to claim 3 containing about 9% of said phospho-sulfurized sperm oil.

References Cited in the file of this patent

UNITED STATES PATENTS

| | | |
|---|---|---|
| 1,936,985 | Lommel et al. | Nov. 28, 1933 |
| 2,169,185 | Shoemaker et al. | Aug. 8, 1939 |
| 2,179,067 | Smith | Nov. 7, 1939 |
| 2,274,022 | Williams | Feb. 24, 1942 |
| 2,451,375 | Bell | Oct. 12, 1948 |

OTHER REFERENCES

Kabachnik, "Isvestiya Akad. Nauk," S. S. S. R. o. k. h. n., 1946, pages 95, 295 and 515.

Davey, "Extreme Pressure Lubricants," Ind. Eng. Chem. 42, 1841–47, Sept. 1950. (Copy in Div. 64.)